United States Patent [19]

Hogberg

[11] 4,191,113

[45] Mar. 4, 1980

[54] TABLE OR STOOL OF SEPARABLE COMPONENTS

[76] Inventor: Carl G. Hogberg, 26 Captains Cove La., North Chatham, Mass. 02650

[21] Appl. No.: 880,638

[22] Filed: Feb. 23, 1978

[51] Int. Cl.² ............................................. A47C 4/02
[52] U.S. Cl. ................................... 108/157; 297/440
[58] Field of Search ............... 297/440, 442; 108/101, 108/111, 153, 157, 154, 159

[56] References Cited

U.S. PATENT DOCUMENTS

| 2,595,002 | 4/1952 | Schneider | 108/101 |
| 3,788,700 | 1/1974 | Wartes | 297/442 |

FOREIGN PATENT DOCUMENTS 387029  2/1933  United Kingdom ................. 108/157

Primary Examiner—Francis K. Zugel
Attorney, Agent, or Firm—Martin J. Carroll

[57] ABSTRACT

A piece of furniture has a top with a pair of grooves therein and a pair of side pieces each having a top projection extending into or through the grooves and a surface for supporting the top. Aligned slots are provided through the side pieces adjacent the bottom. A cross piece having a neck at each end with shoulders at the base of the neck extends between the side pieces with the shoulders held against the inner surface of the side pieces by means of a wedge extending through a hole in the neck on the outside of the side pieces. The length of the cross piece between shoulers is selected so that an inwardly extending force is exerted on the top of the side pieces.

4 Claims, 15 Drawing Figures

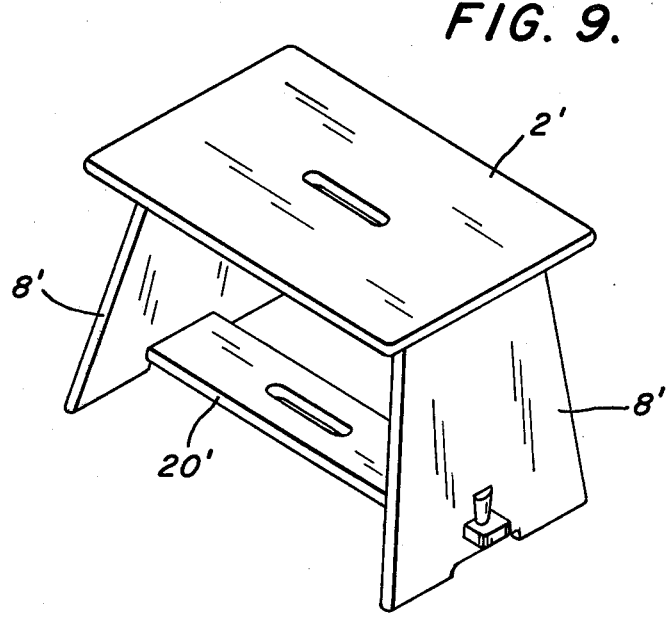
FIG. 9.
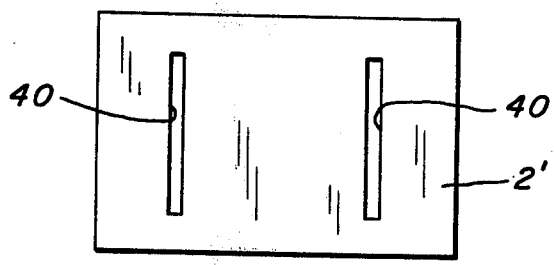
FIG. 10.
FIG. 12.
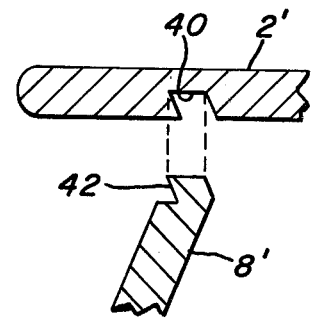
FIG. 11.
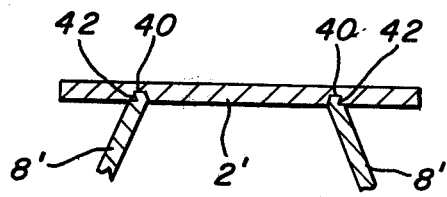

TABLE OR STOOL OF SEPARABLE COMPONENTS

This invention relates to furniture and more particularly to a stool which may be assembled without the use of permanent fasteners; such as nails, screws and/or glue. Furniture has been assembled in this general manner. The best art of which I have knowledge are Rosenthal U.S. pat. No. 2,366,676; Anderson U.S. Pat. No. 2,546,811; and Barghout U.S. Pat. No. 3,485,527. All the art of which I have knowledge have various disadvantages. The construction may be complicated and/or the parts heavy. They may be difficult to assemble and/or may not be or may not remain rigid when assembled.

It is therefor an object of my invention to provide a piece of furniture which may be assembled without permanent fasteners easily and rapidly.

Another object is to provide such furniture which may be light in weight and yet strong in assembly.

Still another object is to provide such furniture which is relatively inexpensive to manufacture.

These and other objects will be more apparent after reviewing the specification and the following description of the drawings in which:

FIG. 9 is a view, similar to FIG. 1, showing a second embodiment of my invention;

FIG. 10 is a plan view of the bottom of the top piece of FIG. 9;

FIG. 11 is a sectional view of the side-top connection;

FIG. 12 is an enlarged sectional view of the unassembled side-top connection;

Figure 1:
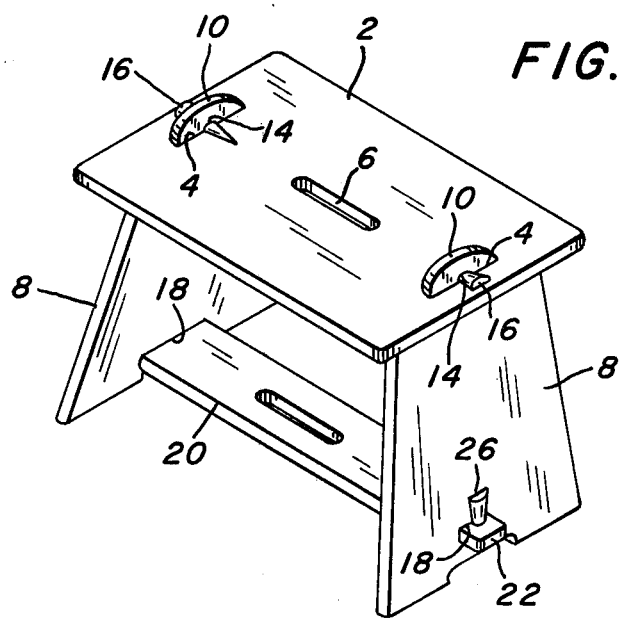
FIG. 1 is a perspective view of one embodiment of my invention.
Figure 2:
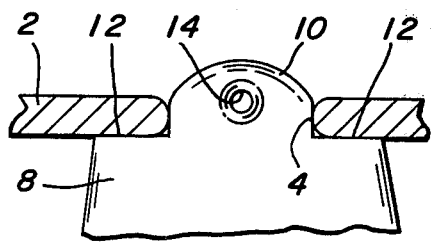
FIG. 2 is a vertical view, partly in section, of the side-top connection.
Figure 3:
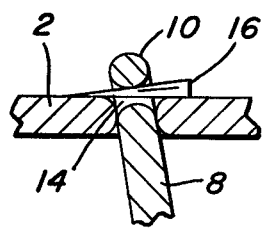
FIG. 3 is a sectional view through the connection of FIG. 2.
Figure 4:
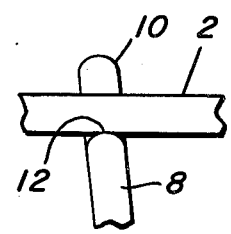
FIG. 4 is an elevation of the connection of FIG. 2.
Figure 5:
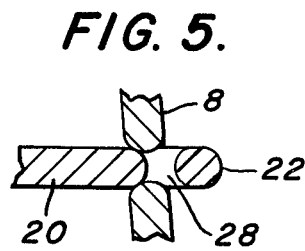
FIG. 5 is a vertical section of the side-cross piece connection with the wedge omitted.
Figure 6:
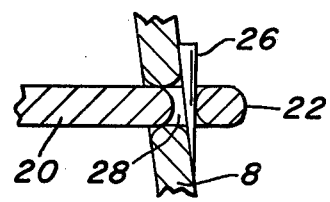
FIG. 6 is a view, similar to FIG. 5, with the wedge in place.
Figure 7:
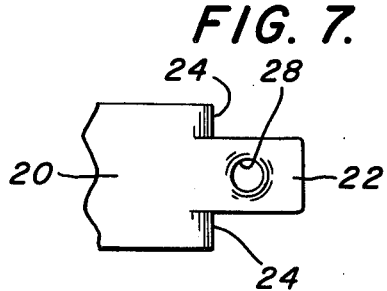
FIG. 7 is a plan view of one end of the cross piece.
Figure 8:
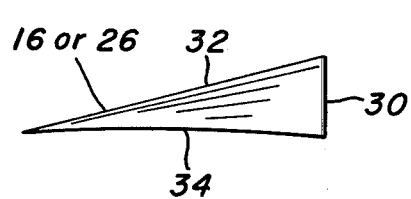
FIG. 8 is a side view of the wedge of my invention.

Referring more particularly to the drawings, reference numeral 2 indicates a top for a piece of furniture which is shown as a stool, but which obviously could be a bench, table or the like. A slot 4 is provided adjacent each end of the top 2. The sides of the slots 4 are convex rounded, preferably on a radius approximately equal to one-half the thickness of the top. A hand hole 6 may be provided in the center of top 4 for ease of carrying.

The top is supported by two sides 8, one associated with each slot 4. As shown, the sides are tapered in outline with the large end down. Each side 8 has a projection 10 at its upper end extending through the associated slot 4 with horizontal shoulders 12 extending outwardly from the projection 10 and on which the top 2 rests. The peripheral edge of projection 10 and the edges of shoulder 12 are convex rounded in the same manner as the sides of slot 4. A hole 14 extends through the projection 10 and is preferably circular in cross-section with its ends being convex rounded in the same manner as the sides of slot 4. A tapered or conical wedge 16 inserted into hole 14 positively holds the side 8 against the shoulders 12. A slot 18 is provided near the base of each side 8 with its sides convex rounded similar to the sides of slot 4.

A cross piece 20 having a neck 22 at each end extends between the sides 8 with the necks extending through slots 18. Shoulders 24 at the base of each neck 22 are held against the inside of sides 8 by means of a tapered or conical wedge 26 extending through a hole 28 in the neck 22. The shapes of the wedge 26 and the hole 28 are similar to those of wedge 26 and hole 14. It is preferred that the wedges 16 and 26 have a round large end 30, a sloping side 32 and a longitudinally concave bottom side 34. When forced into its hole, this concave bottom results in a spring-like holding action of the wedge against the sides of the hole and top or sides, respectively, of the stool. This enhances the rigidity of the assembly and yet permits a certain amount of flexure of the wedge connection when placed under stress.

The length of the cross-piece 20 between shoulders 24 is preferably selected so that it is longer (for example, one inch longer) than the length which would permit an easy fit of the projections 10 into the slots 4. Thus, in assembly, the cross-piece 20 is fitted into the slots 28 in the side pieces 8 and it is then necessary to squeeze together the tops of the sides 8 before they will be admitted through the slots 4 of the top. This results in an outwardly extending force on the top of the side pieces. When completely assembled, there is a locked-in tension with the cross piece 20 acting as a spring-loaded stiffener so as to provide a substantially rigid assembly.

The oval or rounded configuration of the various parts almost entirely eliminates a concentration of stress which would tend to fracture an angular or flat configuration of the same approximate dimension. The oval configuration of shoulders 12 and 24 provide a tangential high strength contact regardless of the angular relationship between the sides and top and between the sides and cross piece; thus eliminating the problem of cutting an exact angle in these shoulders. This results in substantial savings in tool set-up and assembly time.

The embodiment of FIGS. 9 to 12 is similar to that of the first embodiment except that it provides a different means of connecting top 2' to sides 8'. According to this embodiment, spaced apart grooves 40 are provided in top 2' for receiving matching tenons 42 at the top of sides 8'. While the shapes of grooves 40 and tenons 42 may vary they must be of such shape that when the tops of the sides are squeezed together in assembly so that the cross piece is placed under a bending moment, the tops of the sides will readily "snap-fit" into their respective grooves. The assembly and function is otherwise the same as in the first embodiment.

Figure 13:
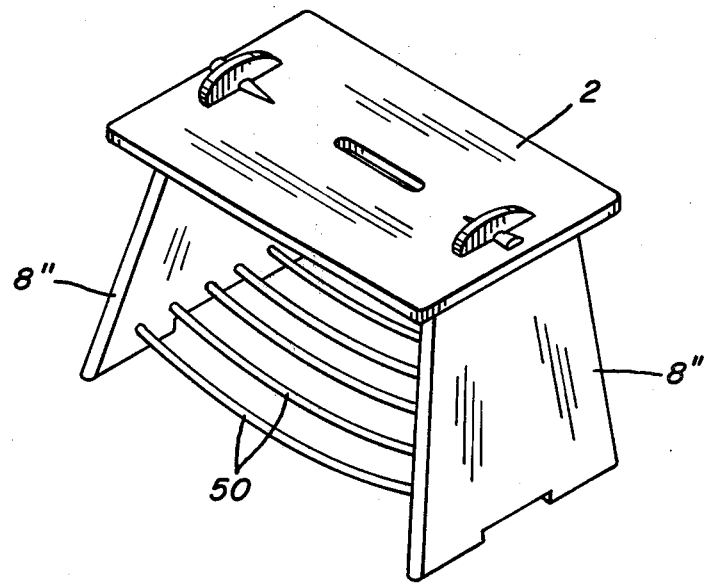
FIG. 13 is a perspective view of a third embodiment of my invention.
Figure 14:
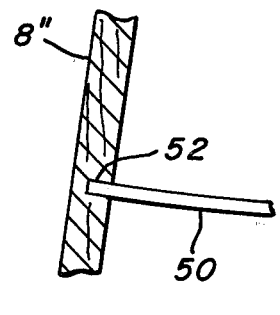
FIG. 14 is a sectional view of a connection of FIG. 13.
Figure 15:
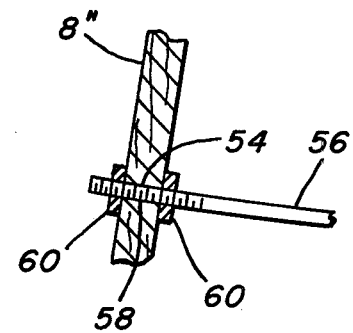
FIG. 15 is a sectional view, similar to FIG. 14, showing a further modification.

FIGS. 13 and 14 disclose a further embodiment in which top 2 is identical with top 2 of FIG. 1 and the connection between it and sides 8" is also the same as in FIG. 1. However, the means for maintaining an outwardly extending force on the tops of the side pieces is different. In place of cross-piece 20 and its connection to the side pieces, two or more resilient rods 50 are inserted into bottomed holes 52 drilled perpendicularly into the sidepieces at approximately the same location as slots 28 in the first embodiment. The rods 50 may be made of resilient wood (such as birch), high carbon spring steel, plastic, or other resilient material. When held in position in the holes the rods 50 provide satisfactory support and adequate springing action when the tops of the sides are pushed together to fit in the slots 4.

In place of holes 52, holes 54 may be drilled through the sides 8" and rods 56, similar to rods 50, but with threaded ends 58 are inserted through the holes with nuts 60 holding the rods from axial movement. The same springing action is provided as in FIG. 14.

It will be noted that the rods 50 and 56 may be of various shapes, such as round, square or oblong without altering their function. By using a single piece of the same material, but of substantially greater width the same result is obtained. Other connections may be used such as flanged ends on the rods fastened to the sides with conventional fasteners.

The invention is particularly suitable for making wood furniture, but is also useful with other materials such as plastic, cellulose materials, wood derivatives or combinations thereof.

While several embodiments have been shown and described, it will be readily apparent to those skilled in the art that various adaptations and modifications may be made within the scope of the invention.

I claim:

1. A piece of furniture comprising a top having a bottom surface, a pair of side pieces each having a surface engaging said bottom surface of said top to support said top, means for holding the top of said side pieces in fixed relationship with said top, said means including a pair of transverse grooves through said top, one associated with each of said side pieces, a top projection on each side piece projecting through and above the associated groove and means supported by each projections bearing against the top surface of said top, said side pieces having aligned openings therethrough adjacent their bottoms, a cross piece having a pair of shoulders one adjacent each end adapted to bear against the associated side piece and a portion extending beyond each shoulder through and beyond each of said aligned openings, and means supported by each of said portions of said crosspiece bearing against the outer surface of said side, said side pieces diverging downwardly and outwardly from said top, the distance between said shoulders being greater than the distance which would permit an easy fit of said top projections into said grooves so that said crosspiece is slightly bent when the top projections of said side pieces are inserted through said top thus providing an outwardly directed force on the tops of said side pieces in the grooves whereby the parts of said furniture are held rigid in assembly.

2. A piece of furniture according to claim 1 in which said surface on each of said side pieces engaging said bottom surface of said top is convex rounded.

3. A piece of furniture according to claim 1 in which the periphery of the aligned slots and the periphery of the transverse grooves are convex rounded, and said surfaces on said side pieces engaging said bottom surface of said top and said shoulders on said crosspiece are convex rounded.

4. A piece of furniture according to claim 3 in which said means supported by each projections bearing against the top surface of said top includes a hole in said projection circular in cross section with its ends being convex rounded and a wedge having a round large end, a sloping side and a longitudinally concaved side in contact with the top surface of the top; and said means supported by each of said portions of said crosspiece bearing against the outer surface of said side includes a hole in said portion circular in cross section with its ends being convex rounded and a wedge having a round large end, a sloping side and a longitudinally concaved side in contact with the outer surface of said side.

* * * * *